United States Patent [19]
Jorgensen et al.

[11] 4,053,179
[45] Oct. 11, 1977

[54] POSITIONING MEANS FOR A WINDSHIELD WIPER ARM ASSEMBLY

[75] Inventors: Stanley A. Jorgensen, Oswego; Kenneth R. Myers, Aurora, both of Ill.

[73] Assignee: Caterpillar Tractor Co., Peoria, Ill.

[21] Appl. No.: 673,504

[22] Filed: Apr. 5, 1976

[51] Int. Cl.² .......................... B60S 1/34; B60S 1/40
[52] U.S. Cl. .................... 296/28 C; 15/250.15; 15/250.16; 15/250.19; 15/250.32; 15/250.34
[58] Field of Search ........... 15/250.15, 250.16, 250.18, 15/250.19, 250.2, 250.21, 250.23, 250.3, 250.32, 250.34, 250.35; 296/28 C

[56] References Cited
U.S. PATENT DOCUMENTS

| 1,471,771 | 10/1923 | Bourlier | 296/28 C |
| 2,481,192 | 9/1949 | Borsuk | 15/250.2 |
| 3,453,679 | 7/1969 | Thorlakson | 15/250.23 X |

FOREIGN PATENT DOCUMENTS

| 2,305,239 | 8/1973 | Germany | 15/250.23 |
| 2,314,724 | 10/1974 | Germany | 15/250.34 |

Primary Examiner—Peter Feldman
Attorney, Agent, or Firm—Phillips, Moore, Weissenberger, Lempio & Majestic

[57] ABSTRACT

A windshield wiper arm assembly comprises a wiper arm having its lower end pivotally mounted on a bracket and a blade pivotally mounted on an upper end of the wiper arm. The bracket is secured on a motor-drive shaft for oscillation therewith. A leaf spring is secured to the upper end of the wiper arm to engage and bias the lower end of the blade towards the windshield. A stop member is secured on the shaft and positioned adjacent to an inboard side of the wiper arm to limit pivotal movement thereof towards the windshield.

10 Claims, 6 Drawing Figures

U.S. Patent  Oct. 11, 1977  Sheet 1 of 2  4,053,179
Fig-1-
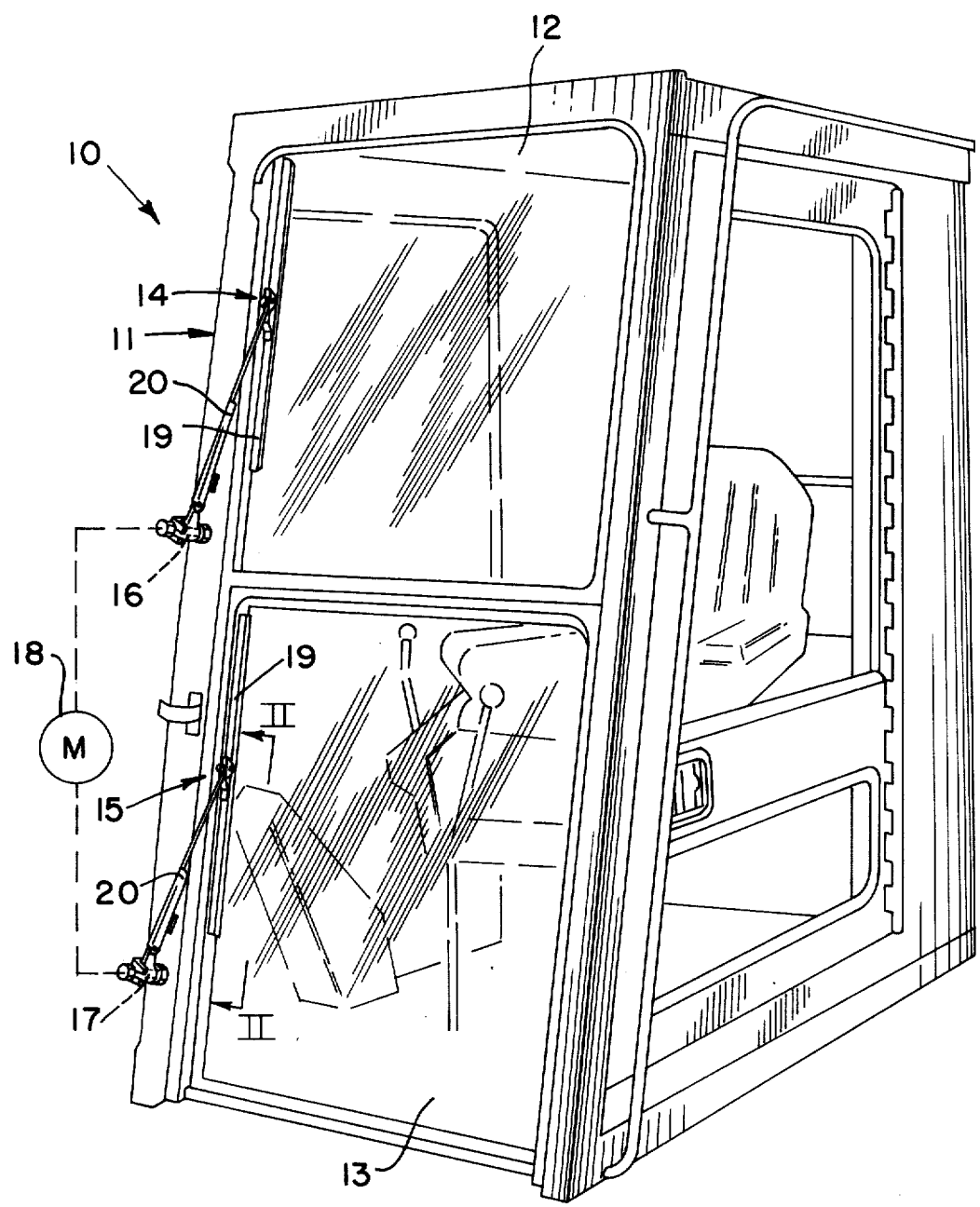

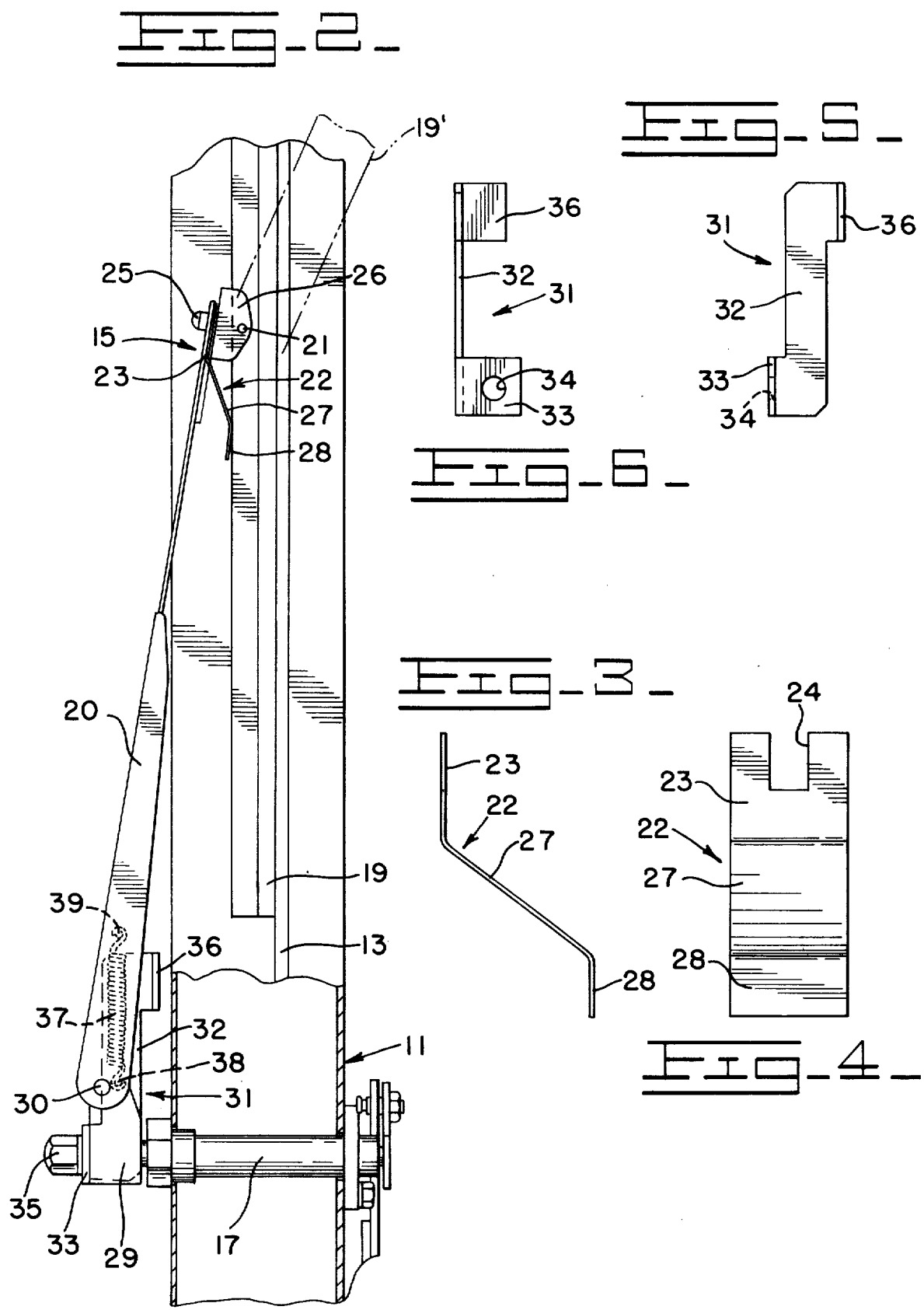

POSITIONING MEANS FOR A WINDSHIELD WIPER ARM ASSEMBLY

BACKGROUND OF THE INVENTION

This invention relates to a windshield wiper arm assembly, particularly adapted for use on an operator's cab of a construction vehicle. The cab normally comprises a slidable lower windshield equipped with a wiper arm assembly for wiping the windshield in the event of rain or the like. Should the operator desire to raise and thus open the windshield for ventilation purposes, the wiper arm assembly, including its blade, will tend to move into the path of the windshield. In addition to deterring reclosing of the windshield, the wiper arm assembly will be subjected to damage. The wiper arm assembly may also be subjected to damage upon inadvertent actuation of the wiper arm assembly when the window is open.

SUMMARY OF THIS INVENTION

An object of this invention is to overcome the above, briefly described problems by providing a non-complex and economical positioning means for a wiper arm assembly to prevent components thereof from moving into the closing path of a windshield, slidably mounted adjacent thereto. The wiper arm assembly comprises a wiper arm having a blade pivotally mounted on an upper end thereof. The positioning means comprises spring means disposed between the wiper arm and a lower end of the blade for biasing the blade outwardly away from the wiper arm to retain the blade at an acute angle relative thereto. In the preferred embodiment of this invention, the wiper arm assembly further comprises a bracket having the lower end of the wiper arm pivotally mounted thereon and the positioning means further comprises stop means for limiting pivotal movement of the wiper arm towards the windshield.

BRIEF DESCRIPTION OF THE DRAWINGS

Other objects of this invention will become apparent from the following description and accompanying drawings wherein:

FIG. 1 is a perspective view of an operator's cab for a construction vehicle, having a pair of windshield wiper arm assemblies mounted thereon;

FIG. 2 is an enlarged side elevational view of one of the wiper arm assemblies, taken in the direction of arrows II—II in FIG. 1, to clearly illustrate positioning means of this invention employed therewith;

FIGS. 3 and 4 are enlarged side and front elevational views, respectively, illustrating a leaf spring of the positioning means; and FIGS. 5 and 6 are enlarged side and front elevational views, respectively illustrating a stop member of the positioning means.

DETAILED DESCRIPTION

FIG. 1 illustrates an operator's cab 10, adapted to be mounted on a construction vehicle or the like, comprising a frame structure 11 having a pair of upper and lower windshields 12 and 13 mounted thereon. A pair of windshield wiper arm assemblies 14 and 15 are mounted on a side rail of the frame for selectively wiping the glass windshields in a conventional manner. In particular, rock shafts 16 and 17 of wiper arm assemblies 14 and 15, respectively, are operatively connected to a common electric drive motor or motor means 18 for oscillation thereby.

Lower window 13 is slidably mounted in a track suitably formed on frame 11 to adapt it for opening by the operator upon raising thereof. As will be hereinafter more fully explained, upon opening of the windshield, wiper arm assembly 15 would normally tend to move inwardly towards the operator's cab and into the closing path of the window to deter closing thereof. The hereinafter described positioning means will prevent such inward movement of a wiper blade 19 and a wiper arm 20 of the wiper arm assembly.

Referring to FIG. 2, blade 19 is pivotally mounted intermediate its ends on an upper end of wiper arm 20 by a pin 21. The above-mentioned positioning means comprises spring means, preferably in the form of a leaf spring 22. The spring is disposed between the wiper arm and a lower end of the blade for biasing the blade outwardly away from the wiper arm and towards the windshield to maintain the blade at an acute angle relative to the wiper arm. As shown in detail in FIGS. 3 and 4, the leaf spring is generally Z-shaped to comprise a flat upper anchor portion 23 having a slot 24 formed therethrough.

As further shown in FIG. 2, the anchor portion of the spring is thus adapted to straddle the shank of a set screw 25 which clamps the spring in place and attaches a mounting bracket 26 for blade 19 on the upper end of the wiper arm. A flat intermediate cantilevered portion 27 of the leaf spring projects downwardly and outwardly from the wiper arm to terminate at a flat lower finger portion 28. The finger portion engages a backside of blade 19 to thus bias it into its outward position relative to the wiper arm.

The lower end of the wiper arm is pivotally mounted on a bracket 29 by a pin 30. The bracket is suitably secured on shaft 17 to oscillate therewith upon actuation of motor 18 (FIG. 1). The positioning means preferably also comprises a stop member 31, shown in detail in FIGS. 5 and 6. The stop member comprises a flat body portion 32 having a first right-angle flange 33 formed integrally on a lower end thereof.

Flange 33 has an aperture 34 formed therethrough to mount and anchor the flange on an outer end of shaft 17 by a nut 35 thereof. A second right-angle flange 36 is formed integrally on an upper end of the stop member and on an opposite side thereof in parallel relationship relative to flange 33. Flange 36 provides a stop means disposed adjacent to an inboard side of wiper arm 20 to limit inward movement thereof towards windshield 13 of the operator's cab. As shown in FIG. 2, a standard tension coil spring or spring means 37 has its lower end anchored to a pin 38, secured to bracket 29. The upper end of the spring anchored to a pin 39, secured to the wiper arm. Pin 38 is disposed on an inboard side of pivot pin 30 in offset relationship therewith to permit spring 37 to urge blade 19 into wiping contact with windshield 13.

During normal operation of the vehicle with window 13 closed, spring 22 will function to maintain blade 19 in wiping contact with the windshield. Upon raising of windshield 13 to an open position above wiper arm assembly 15, a conventional wiper arm assembly would permit its blade 19', partially shown by phantom lines in FIG. 2, to pivot clockwise about pin 21. Also, in the absence of stop member 31, the wiper arm itself would pivot clockwise about pin 30, under the influence of spring 37. Such movement of the wiper blade and wiper arm would thus dispose portions thereof in the closing path of the window to prevent closing thereof.

In order to overcome this problem, spring 22 of this invention will function to pivot blade 19 counterclockwise about pin 21 to bias it outwardly away from wiper arm 20 and to maintain it at an acute angle which is slightly greater than angle $a$, i.e., cocked slightly relative to the plane of the windshield. The blade is thus continuously disposed in at least parallel relationship relative to windshield 13 to permit closing thereof. In addition, stop means or flange 36 of stop member 31 will engage an inboard side of the wiper arm to limit clockwise pivoting thereof about pin 30. Thus, spring 22 and stop member 31 provide positioning means for permitting closing of the windshield without interference and also permit the wiper arm assembly to oscillate, even though the windshield is open, without damaging components thereof.

We claim:

1. A windshield wiper arm assembly comprising
   a wiper arm adapted for mounting adjacent to a windshield, and adapted to receive a portion of a rock shaft for causing oscillation of said wiper arm about the axis of said rock shaft
   a blade pivotally mounted on an upper end of said wiper arm, said blade being pivotal around a pin means positioned so that the axis thereof is perpendicular to the axis of said rock shaft, and
   positioning means comprising spring means having a first end thereof secured to an upper end of said wiper arm and a second end thereof engaging a lower end of said blade directly for biasing said blade outwardly away from said wiper arm and toward said windshield and in a direction generally paralled to the axis of said rock shaft to maintain said blade at an acute angle relative thereto.

2. The wiper arm assembly of claim 1 further comprising an operator's cab including a frame and a windshield mounted on said frame for sliding movements thereon between open and closed positions and wherein said wiper arm assembly is mounted on said frame, adjacent to said windshield.

3. The wiper arm assembly of claim 2 wherein a lower end of said wiper arm is pivotally mounted on a bracket and further comprising a spring interconnected to said bracket and to said wiper arm for pivoting said wiper arm towards said windshield and stop means for limiting pivotal movement of said wiper arm towards said windshield.

4. The wiper arm assembly of claim 3 further comprising a rock shaft mounted for oscillation on said frame and wherein said bracket and said stop means are each secured to an end of said rock shaft.

5. The windshield wiper arm assembly of claim 4 wherein said stop means comprises a stop member having a substantially flat body portion, a lower flange extending transversely from said body portion and mounted on said rock shaft and an upper flange extending transversely from said body portion and disposed adjacent to an inboard side of said wiper arm to provide said stop means thereat.

6. The wiper arm assembly of claim 5 wherein said spring means constitutes a leaf spring comprising an upper portion anchored to the upper end of said wiper arm and a lower portion engaging an outboard side of said blade.

7. The wiper arm assembly of claim 1 wherein said spring means constitutes a leaf spring.

8. The wiper arm assembly of claim 7 wherein said leaf spring is generally Z-shaped to sequentially comprise an upper anchor portion secured to the upper end of said wiper arm, a cantilevered portion extending downwardly and outwardly from said wiper arm and a lower finger portion engaging a backside of said blade.

9. The wiper arm assembly of claim 2 further comprising a second windshield mounted above said first-mentioned windshield and a second wiper arm assembly mounted on said frame adjacent to said second windshield.

10. The wiper arm assembly of claim 9 further comprising a common motor means operatively connected to each of said wiper arm assemblies for selectively oscillating rock shafts thereof simultaneously.

* * * * *